United States Patent [19]

Levy et al.

[11] Patent Number: 4,765,877

[45] Date of Patent: Aug. 23, 1988

[54] POWER SUPPLY MEANS FOR A WIRE ELECTRODE OF AN ELECTROEROSION MACHINE

[75] Inventors: Gideon Levy, Orselina; Josef Budin, Minusio, both of Switzerland

[73] Assignee: AG fur Industrielle Elektronik AGIE, Losone b. Locarno, Losone, Switzerland

[21] Appl. No.: 33,001

[22] Filed: Mar. 31, 1987

[30] Foreign Application Priority Data

Apr. 2, 1986 [DE] Fed. Rep. of Germany ....... 3611001

[51] Int. Cl.⁴ ............................................. B23H 7/10
[52] U.S. Cl. .............................. 204/206; 204/224 M; 204/279; 204/290 R; 219/69 W
[58] Field of Search ............... 204/224 M, 206, 279, 204/290 R; 219/69 W; 428/450, 469, 698

[56] References Cited

U.S. PATENT DOCUMENTS

| | | | |
|---|---|---|---|
| 2,366,509 | 1/1945 | Francisco | 204/206 X |
| 2,708,181 | 5/1955 | Holmes et al. | 204/279 |
| 2,906,853 | 9/1959 | Sibley | 219/69 W |
| 2,974,216 | 3/1961 | Inoue | 219/69 W |
| 3,320,039 | 5/1967 | Hollister | 428/469 X |
| 4,019,873 | 4/1977 | Reiter | 428/698 X |
| 4,422,918 | 12/1983 | Inoue | 204/224 M X |

FOREIGN PATENT DOCUMENTS

| | | | |
|---|---|---|---|
| 2810437 | 9/1978 | Fed. Rep. of Germany | 219/69 W |
| 0134622 | 8/1984 | Japan | 219/69 W |

*Primary Examiner*—Donald R. Valentine
*Attorney, Agent, or Firm*—Helfgott & Karas

[57] ABSTRACT

A power supply component for cutting a wire electrode of an electroerosion machine having a core of hard metal and about it a layer of an electrically conductive material, which is softer than the core. Within a relatively short time, when the machine is in use, the wire cuts a notch in the soft layer, the notch acting as a wire guide. As soon as the notch reaches the harder material of the core, the hard metal prevents any further notch deepening.

10 Claims, 2 Drawing Sheets

POWER SUPPLY MEANS FOR A WIRE ELECTRODE OF AN ELECTROEROSION MACHINE

BACKGROUND OF THE INVENTION

The invention relates to a power supply component for a wire electrode of an electroerosion machine.

Such fixed power components along which a wire electrode moves are generally known and are e.g. described in EP-A1-No. 0 128 958 or JP-OS No. 56-76 334.

In the case of known power supply components of this type, the wire cuts into the component, so that the latter component has a relatively short service life. These components have to be realigned after a relatively short time to ensure that the wire does not run into a cut notch, or alternatively these components must be replaced relatively frequently.

JP-OS No. 60-167 720 proposes the solution of this problem by forming the power supply component from superhard, electrically conductive material and to provide therein a guide groove for the wire.

Instead of this, DE-OS No. 31 22 205 proposes a rotary power supply component, in which the rotation axis is at right angles to the wire and consequently a tangentially sliding electric contact is formed.

A power supply component for a wire cutting machine must satisfy the four following requirements:
1. It must ensure a good electric contact.
2. It must be almost non-wearing and therefore have a long service life.
3. To a certain extent it must guide the wire.
4. It must damp vibrations of the wire.

In the power supply components referred to hereinbefore the necessary limited wearing does not occur. There is also the additional disadvantage that in the case of deeper notches cut by the wire, automatic wire threading is made difficult after a wire breaks.

In the case of rotary power supply components of DE-OS No. 31 22 205 the above requirements 3 and 4 are not satisfied, because the tangential sliding contact on the end face of the rotating cylindrical power supply means cannot bring about any guidance and damping and in fact undesired wire vibrations are caused.

The power supply component of JP-OS No. 60-167 720 with the superhard material and the guide groove admittedly fulfills requirements 2 and 3, but the electrical conductivity of hard metals is relatively poor as compared with good conducting metals, such as copper and the like. In addition, with super hard metal, the contact surface between wire and power supply means is very small and there is only a line contact. The guide groove provided there also leads to no significant improvement. If the guide groove is in the form of a V-shaped groove, the wire, which has a circular cross-section, is in contact with said groove along two lines. If the guide is made U-shaped, a larger contact surface is only obtained if the arc of the guide groove precisely coincides with the wire diameter. Thus, a separate guide groove must be provided for each wire diameter. Moreover said wire guide does not satisfy requirement 4 regarding good vibration damping. Finally the prefabricated wire guide must be precisely aligned with respect to the wire.

The problem of the present invention is therefore to improve the power supply means of the aforementioned type in that it simultaneously fulfills the following four requirements:
1. Good electric contact
2. Almost no wear.
3. Good wire guidance.
4. Wire vibration damping.

SUMMARY OF THE INVENTION

In brief, the power supply component in accordance with the principles of the invention is a stationary base having a hard core and a superimposed layer of electrically conductive material, which is softer than the core. In use, electric power from a power cable connected to the power supply of the electroerosion machine is supplied to the component.

Within a relatively short time, the cutting wire used in the machine which overlies the component cuts into the layer of the component a groove adapted to its contour. A relatively large contact surface between the wire and power components is formed, so that good electrical contact is ensured. Moreover this cut groove serves as a precise guide, which also has good vibration damping characteristics. As soon as the groove cut by the wire has reached the hard core, the wire cannot cut any deeper into the material, so that the necessary low wear characteristics are obtained. Thus, as a result of the technically very simple measures of the invention, the aforementioned four, partly contradictory requirements are fulfilled.

As an additional advantage, there is a further improvement to the electrical characteristics, because a noticeable skin effect occurs on the power supply component with the high electric currents and/or frequencies of the electric pulses used during erosion. Most of the electric current consequently flows in the surface of the good electrically conducting layer, while additionally ensuring that the wire is always in electric contact with the power supply component at this point and not in lower layers carrying lower currents.

This even makes it possible to make the core from non-conducting material, e.g. from an extremely hard non-wearing ceramic.

The thickness of the softer layer should be no greater than half the diameter of the wire. However, lower thicknesses have also already led to excellent results, so that the layer thickness should be between 5 and 500 $\mu$m, but preferably between 10 and 20 $\mu$m.

The aforementioned objects and advantages of the invention as well as other objects and advantages thereof will either be explained or will become apparent to those skilled in the art when this specification is read in conjunction with the accompanying drawings and specific description of preferred embodiments which follow.

DETAILED DESCRIPTION OF THE PREFERRED EMBODIMENT

Figure 1:
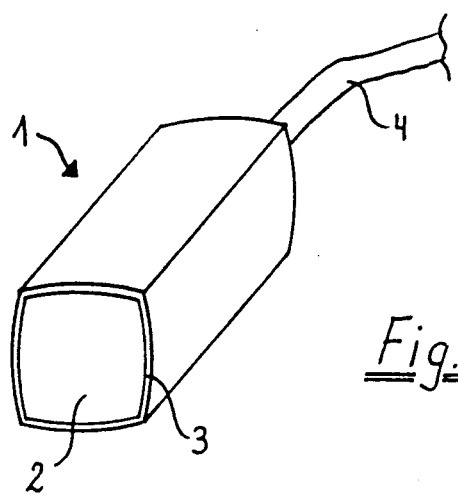
FIG. 1 is a perspective view of the power supply component in accordance with tone embodiment of the invention.
Figure 2:
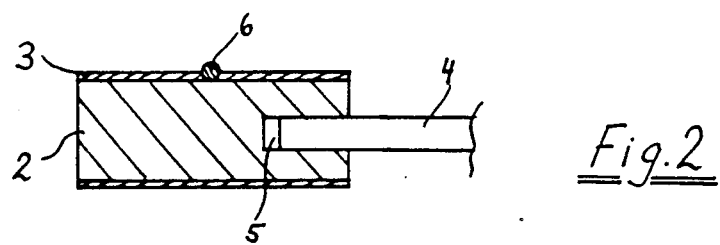
FIG. 2 is a longitudinal section through the power supply component of FIG. 1.

The external shape of the power supply component 1 of FIGS. 1 and 2 corresponds to the prior art. The power supply means is a stationary, elongated, parallelepipedic bar with rounded, spherical lateral faces. Core 2 is made from very hard material e.g. hard metal G 30 or sintered metal carbides such as tungsten carbide or titanium carbide. Ceramic materials in particular electrically conductive ceramic materials can also be used for core 2. At least on the lateral faces coming into contact with a wire electrode 6, core 2 is provided with a layer 3 of electrically conductive soft material e.g., nickel or copper. In a preferred embodiment, layer 3 has a thickness of 10 to 20 $\mu$m, but can also have a thickness of up to approximately 500 $\mu$m. An upper limit for the thickness of layer 3 is roughly half the diameter of wire 6.

Figure 3:
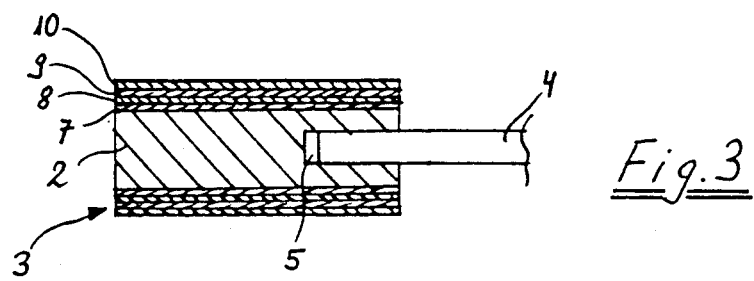
FIG. 3 is a similar longitudinal section through a second embodiment of the invention.

In the embodiment of FIGS. 1 to 3 core 2 is made from electrically conductive material. Therefore, one end of power cable 4 from a power supply in the electroerosion machine can be inserted and e.g. soldered in dead ended axially extending bore 5 in the core which is spaced from the layer 3.

During the operation of the electroerosion machine, cutting wire 6 is driven and slides over part of the surface of power supply component 1. As a result of the relatively soft layer, within a short time the wire cuts a clearly defined notch in component 1, which serves as a guide. The underlying, very wear-resistant material of core 2 then prevent further deepening of the notch. Due to the fact that the wire cuts its "own" notch, there is no need to precisely align the power supply component in the machine with respect to the wire, as was the case with the aforementioned power supply means having a prefabricated guide groove.

Using the power supply means according to FIGS. 1 and 2, practical test gave the following results using a chemically nickel-coated hard metal G-30 (surface hardness : HRC 67-69):

| Erosion Period | Depth of Cut ($\mu$m) | Width of Cut ($\mu$m) |
| --- | --- | --- |
| After 2 hours | 5 | 270 |
| After 15 hours | 8 | 300 |
| After 25 hours | 10 | 310 |
| After 82 hours | 10 | 320 |

These results show that after approximately 15 to 25 hours the outer surface wire had already reached the hard metal and engaged its outer surface and that after 25 hours no further wear could be detected. The thickness of the softer layer was 10 $\mu$m.

The above measured values were obtained on the lower power supply component. However, only very limited wear was revealed on the upper power supply component with the period of measurement. This also corresponds to the practical observations in connection with the prior art, according to which wear to the lower wire guide is must greater than to the upper wire guide. This is due to the fact that after passing through the working zone the wire has become much rougher and therefore acts as a "saw". The additional effect occurs in the electroerosion of hard metal, that the roughened wire surface becomes partly clogged with hard metal particles, particulary very hard carbides, which have a greater abrasion than the material of the wire.

FIG. 3 shows another embodiment of the invention, in which layer 3 comprises several superimposed coatings 7 to 10. For example, copper and nickel coatings alternate. This multicoating structure is particularly advantageous if a layer material has a poor adhesion to the core material and if a greater coating thickness of the layer is desired. If in the case of certain layer materials the coating thickness was chosen too large, a risk of peeling off exists.

Figure 4:
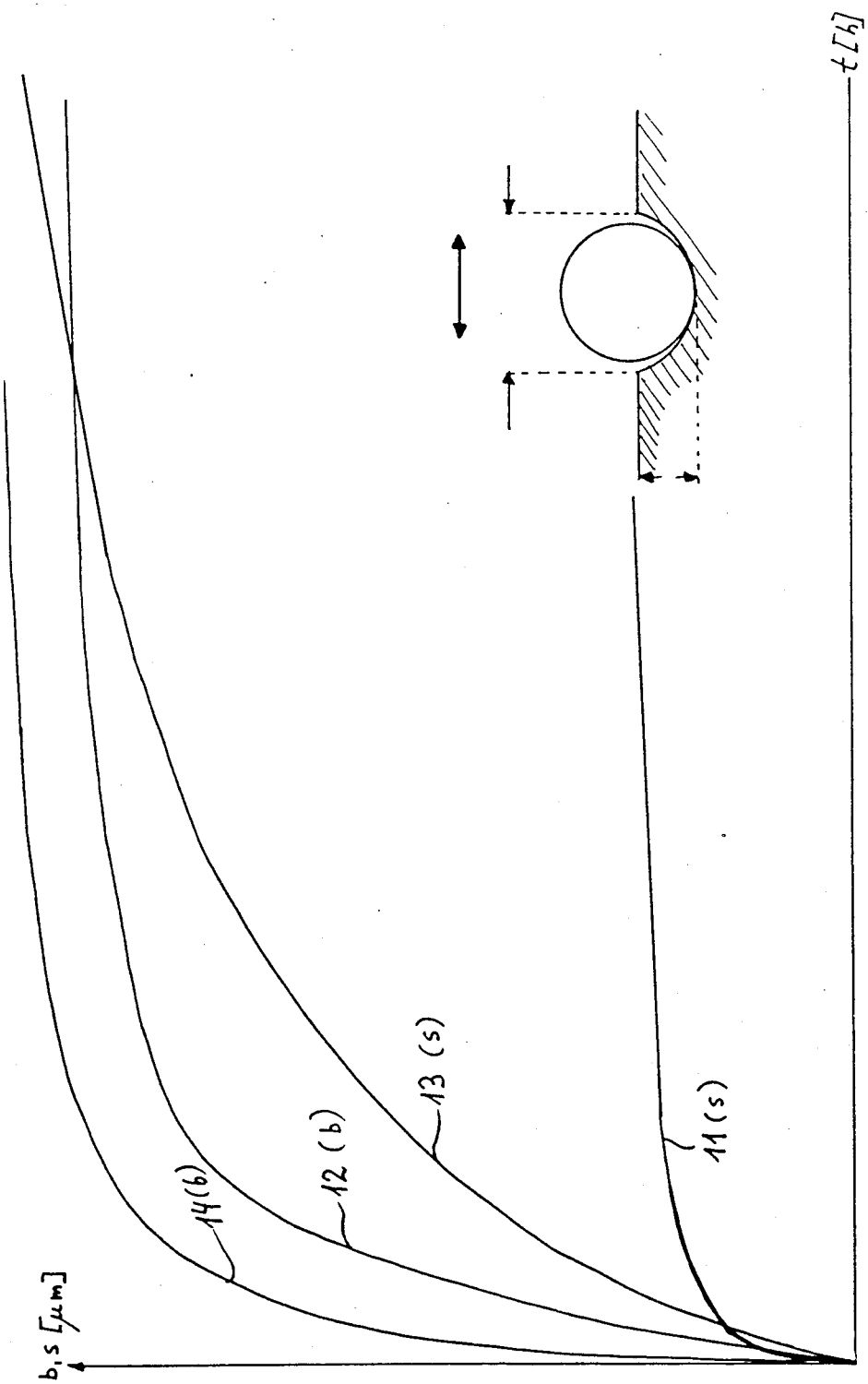
FIG. 4 is a graph of wear curves for the power supply component according to the invention compared with those of the prior art.

FIG. 4 shows wear curves for the lower power supply component. Curve 11 indicates the depth of the notch cut in the power supply means by the wire as a function of the erosion time in the case of a power supply component according to the invention. Curve 12 indicates the width of the notch cut by the wire as a function of time in the case of the embodiment according to the invention. In corresponding manner, curves 13 and 14 indicate the depth and width of the notch in the case of a power supply component according to the prior art, which was completely formed from tungsten. In all cases there was a straight cut in the erosion direction indicated by the arrow.

The curves clearly show that the invention, drastically reduces wear and consequently considerably lengthens the service life of the power supply component.

While the fundamental novel features of the invention have been shown and described and pointed out, it will be understood that various substitutions and changes in the form of the details of the embodiments when may be made by those skilled in the art without departing from the spirit of the invention.

What is claimed is:

1. A component for supplying electric power to a wire electrode of an electroerosion machine, said component being a stationary bar comprising:
   a core composed of a first hard material; and
   at least one outer layer composed of a second material, said second material being electrically conductive and softer than the core and engaging said wire electrode.

2. The component of claim 1 wherein the first material is selected from the class consisting of hard metals, sintered metal carbides and electrically conductive and electrically non-conductive ceramics.

3. The component of claim 2 wherein the second material is selected from the class of electrically conductive relatively soft metals.

4. The component of claim 3 wherein the class of electrically conductive metals consists of nickel and copper.

5. The component of claim 4 wherein the outer layer has a thickness falling within the range of 5.0 to 500 $\mu$m.

6. The component of claim 5 wherein the thickness falls within the range of 10 to 20 $\mu$m.

7. In an electroerosion machine having an electric power supply with a power cable, in combination:
   means connected to said cable to receive electrical power therefrom said means including a stationary bar, said bar having a core of a first hard material and an outer layer of a second softer electrically conductive material, said power being fed to the outer layer; and
   an electrically conductive cutting wire partially imbedded in the outer layer and receiving power therefrom.

8. The combination of claim 7 wherein the wire extends through the outer layer, the outer surface of the wire engaging the outer surface of the core.

9. The combination of claim 8 wherein the core is composed of an electrically conductive material, the core having a dead ended longitudinally extending bore in which one end of the cable is disposed.

10. The combination of claim 9, wherein the thickness of the outer layer cannot exceed one-half the thickness of the wire.

* * * * *